United States Patent Office 3,361,750
Patented Jan. 2, 1968

3,361,750
BENZOTHIAZEPINES
John Krapcho, Somerset, N.J., assignor, by mesne assignments, to E. R. Squibb & Sons, Inc., New York, N.Y., a corporation of Delaware
No Drawing. Filed Mar. 21, 1963, Ser. No. 266,824
10 Claims. (Cl. 260—268)

This invention relates to new chemical compounds having valuable therapeutic properties and processes and intermediates for the preparation thereof.

The therapeutically active compounds of this invention are bases of the general Formula I:

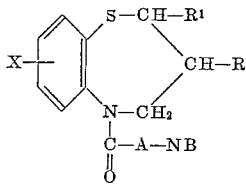

(I)

and the acid-addition salts thereof, wherein X is hydrogen, lower alkyl, lower alkoxy, nitro, halo or trifluoromethyl; R is hydrogen or lower alkyl; $R_1$ is hydrogen, lower alkyl, or an X-substituted phenyl lower alkyl; A is lower alkylene (perferably methylene and ethylene); and NB is a basic nitrogen-containing radical of less than twelve carbon atoms. Among the suitable radicals represented by the symbol NB are: amino; (lower alkyl)amino; di(lower alkyl)amino; (hydroxyl - lower alkyl)amino; di(hydroxy - lower alkyl)amino; phenyl - (lower alkyl)amino; N - (lower alkyl) - N - phenyl(lower alkyl)amino; and saturated 5 to 7 membered monocyclic N - heterocyclic radicals of less than twelve carbon atoms, as exemplified by piperidino; (lower alkyl) - piperidino; (lower alkoxy)piperidino; homopiperidine; pyrrolidino; (lower alkyl) - pyrrolidino; di(lower alkyl)pyrrolidino; (lower alkoxy)pyrrolidino; morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl)piperazino (e.g., $N^4$-methylipiperazino); di(lower alkyl) piperazino; (lower alkoxy) - piperazino; $N^4$ - (hydroxy - lower)piperazino; $N^4$ - (lower alkanoyloxy - lower alkyl)piperazino; and homopiperazino. The terms "lower alkyl," and "lower alkoxy," and "lower alkylene" as employed herein, include both straight and branched chain radicals of less than eight carbon atoms. The particularly preferred compounds are those wherein X is hydrogen or chloro; R is hydrogen; $R_1$ is lower alkyl; A is methylene or ethylene; and NB is di(lower alkyl)amino, piperidino or $N^4$-methylpiperazino.

As to the salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric and hydrobromic acid), sulfuric acid, nitric acid, boric acid and phosphoric acid, and organic acids, such as oxalic, tartaric, citric, acetic, succinic, pamoic and maleic acid.

The compounds of this invention and the acid-addition salts thereof are therapeutically active compounds which posses antispasmodic activity and hence are utilized in the treatment of Parkinsonism. Thus, the compounds of this invention can be administered perorally, the dosage for such treatment being adjusted for the activity of the particular compound employed.

The compounds of this invention can be prepared by the process of this invention, the first step of which comprises reducing a compound of the general Formula II:

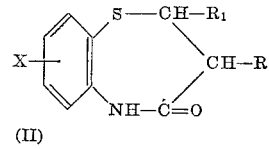

(II)

wherein X, R and $R_1$ are as hereinbefore defined. Compounds II can be prepared as disclosed in U.S. Patent No. 3,075,967, granted Jan. 29, 1963. The reduction is accomplished by treating Compounds II with a reducing agent, such as lithium aluminum hydride, whereby the intermediates of the general Formula III are formed:

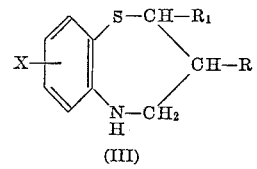

(III)

wherein X, R and $R_1$ are as herebefore defined.

Suitable starting compounds of the Formula II include: 2,3 - dihydro - 1,5 - benzothiazepin - 4 - one; 2,3 - dihydro - 2 - (lower alkyl) - 1,5 - benzothiazepin - 4 - ones, such as 2,3 - dihydro - 2 - methyl - 1,5 - benzothiazepin - 4 - one, 2,3 - dihydro 2 - ethyl - 1,5 - benzothiazepin - 4 - one and 2,3 - dihydro - 2 - n - hexyl - 1,5 - benzothiazepin - 4 - one; 2,3 - dihydro 2 - (X - substituted penyl - lower alkyl) - 1,5 - benzothiazepin - 4 - ones, such as 2,3 - dihydro - 2 - benzyl - 1,5 - benzothiazepin - 4 - one, 2,3 - dihydro - 2 - phenethyl - 1,5 - benzothiazepin - 4 - one and aromatically substituted lower alkyl, lower alkoxy, nitro, halo, and trifluoromethyl derivatives thereof; 2,3 - dihydro - 3 - (lower alkyl) - 1,5 - benzothiazepin - 4 - ones, such as 2,3 - dihydro - 3 - methyl - 1,5 - benzothiazepin - 4 - one, 2,3 - dihydro - 3 - ethyl - 1,5 - benzothiazepin - 4 - one and 2,3 - dihydro - 3 - n - butyl - 1,5 - benzothiazepin - 4 - one; 2,3 - dihydro - 2,3 - di(lower alkyl) - 1,5 - benzothiazepin - 4 - ones, such as 2,3 - dihydro - 2,3 -dimethyl - 1,5 - benzothiazepin - 4 - one and 2,3 - dihydro - 2 - methyl - 3 - ethyl - 1,5 - benzothiazepin - 4 - one; and 2,3 - dihydro - 2 - (X - substituted phenyl - lower alkyl) - 3 - (lower alkyl) - 1,5 - benzothiazepin - 4 - ones, such as 2,3 - dihydro - 2 - benzyl - 3 - methyl - 1,5 - benzothiazepin - 4 - one, and aromatically substituted lower alkyl, lower alkoxy, nitro, halo and trifluoromethyl derivatives thereof.

Compounds III are then condensed with a chloro(lower alkanoyl) chloride of the formula: Cl—A—COCl, wherein A is as hereinbefore defined, to yield new intermediates of this invention of the general Formula IV.

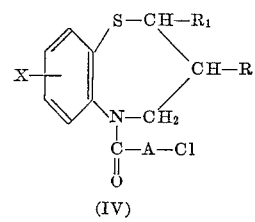

(IV)

wherein X, R, $R_1$ and A are as hereinbefore defined. The reaction is preferably conducted in an organic solvent for the reactants in the presence of tertiary organic base, such as triethylamine, at an elevated temperature, such as the reflux temperature of the mixture.

Compounds IV are then reacted with a base of the formula: HNB, wherein NB is as hereinbefore defined to yield the final products of this invention.

The following examples illustrate the invention (all temperatures being in centigrade):

EXAMPLE 1

*2,3,4,5-tetrahydro-2-methyl-5-piperidinoacetyl-1,5-benzothiazepine hydrochloride*

(A) Preparation of 2,3,4,5-tetrahydro-2-methyl-1,5-benzothiazepine

A slurry of 19.0 g. of lithium aluminum hydride in 2.5 l. of anhydrous ether is treated portionwise with 96.5 g. of 2,3 - dihydro - 2 - methyl - 1,5 - benzothiazin - 4 - one. After stirring for 40 hours at room temperature, the mixture is cooled and treated with 32 ml. of ethyl acetate, followed by dropwise addition of 64 ml. of water and then a solution of 16 g. of sodium hydroxide in 200 ml. of water. The organic phase is filtered from the inorganic salt and the filtrate dried over magnesium sulfate. After evaporation of the solvent, the residue is fractionated to give about 77.6 g. of product; B.P. about 110–111° (0.3 mm.). This material solidifies and melts at about 45–47°.

(B) Preparation of 5-chloroacetyl-2,3,4,5-tetrahydro-2-methyl-1,5-benzothiazepine A solution of 138.0 g. of material from part (A), 78.0 g. of triethylamine and 1 l. of benzene is cooled, stirred and treated with a solution of 87 g. of chloroacetyl chloride in 300 ml. of benzene. The mixture is stirred at room temperature for three hours, refluxed for 30 minutes, cooled and treated with 200 ml. of cold water. The layers are separated and the organic phase is washed with 300 ml. of dilute hydrochloric acid and then with 450 ml. of water. The organic layer is then dried over magnesium sulfate, filtered and the filtrate concentrated under reduced pressure to give the product. After two crystallizations from isopropyl alcohol the nearly colorless product weighs about 103 g.

(C) Preparation of 2,3,4,5-tetrahydro-2-methyl-5-piperidinoacetyl-1,5-benzothiazepine A mixture of 42 g. of material from part (B), 43.0 g. of piperidine and 200 ml. of xylene is refluxed for eight hours, cooled and treated with 100 ml. of water and then a solution of 35 ml. of conc. hydrochloric acid in 200 ml. of water. The aqueous phase is cooled and treated with a solution of 25 g. of sodium hydroxide in 100 ml. of water. The liberated base is extracted with ether and the extract dried over magnesium sulfate. The solvent is evaporated and the residue fractionated to give about 45 g. of pale yellow liquid; B.P. about 165–167°(0.1 mm). This distillate rapidly solidifies, M.P. about 106–107°.

(D) Preparation of 2,3,4,5-tetrahydro-2-methyl-5-piperidinoactyl-1,5-benzothiazepine, hydrochloride A solution of 44.5 g. of material from part (C) in 50 ml. of ethanol is treated with an equivalent of hydrogen chloride in 27 ml. of ethanol. The resulting solution is diluted to 800 ml. with ether to give about 43 g. of product, M.P. about 186–188°. After crystallization from 150 ml. of acetonitrile-500 ml. of ether, the product melts at about 187–189°.

EXAMPLE 2

*2,3,4,5-tetrahydro-2-methyl-5-[(4-methyl-1-piperazinyl)acetyl]-1,5-benzothiazepine, hydrochloride*

Interaction of 51.0 g. of material from part (B) of Example 1 with 50 g. of N-methylpiperazine in 300 ml. of xylene is carried out in the same manner as described in part (C) of Example 1 to give about 56 g. of nearly colorless liquid; B.P. about 175–176 (0.1 mm). The distillate rapidly solidifies, M.P. about 118–120°. This base (50.7 g.) is dissolved in 40 ml. of absolute alcohol and treated with one equivalent of hydrogen chloride in 30 ml. of absolute alcohol. The solution is diluted with 700 ml. of ether to give about 56.5 g. of product; M.P. about 160–163°. After crystallization from 200 ml. of acetonitrile-400 ml. of ether, the colorless product weighs about 50.0 g., M.P. about 163–165°.

EXAMPLE 3

*5-dimethylaminoacetyl-2,3,4,5-tetrahydro-2-methyl-1,5-benzothiazepine, hydrochloride*

Following the procedure of Example 1 but substituting an equivalent amount of dimethylamine for the piperidine in part (C), 5 - dimethylaminoacetyl - 2,3,4,5 - tetrahydro - 2 - methyl - 1,5 - benzothiazepine, hydrochloride is obtained.

EXAMPLE 4

*5-pyrrolidinoacetyl-2,3,4,5-tetrahydro-2-methyl-1,5-benzothiazepine, hydrochloride*

Following the procedure of Example 1 but substituting an equivalent amount of pyrrolidine for the piperidine in part (C), 5 - pyrrolidinoacetyl - 2,3,4,5 - tetrahydro - 2 - methyl - 1,5 - benzothiazepine, hydrochloride is obtained.

EXAMPLE 5

*5-(N-methyl-N-phenethylaminoacetyl)-2,3,4,5-tetrahydro-2-methyl-1,5-benzothiazepine, hydrochloride*

Following the procedure of Example 1 but substituting an equivalent amount of N-methyl-N-phenethylamine for the piperidine in part (C), 5-(N-methyl-N-phenethylaminoacetyl) - 2,3,4,5 - tetrahydro-2-methyl-1,5-benzothiazepine, hydrochloride is obtained.

EXAMPLE 6

*5-morpholinoacetyl-2,3,4,5-tetrahydro-2-methyl-1,5-benzothiazepine, hydrochloride*

Following the procedure of Example 1 but substituting an equivalent amount of morpholine for the piperidine in part (C), 5 - morpholinoacetyl - 2,3,4,5-tetrahydro-2-methyl-1,5-benzothiazepine, hydrochloride is obtained.

EXAMPLE 7

*5-diethylaminoacetyl-2,3,4,5-tetrahydro-2-methyl-1,5-benzothiazepine, hydrochloride*

Following the procedure of Example 1 but substituting an equivalent amount of diethylamine for the piperidine in part (C), 5-diethylaminoacetyl - 2,3,4,5-tetrahydro-2-methyl-1,5-benzothiazepine, hydrochloride is obtained.

EXAMPLE 8

*5-(3-piperidinopropionyl)-2,3,4,5-tetrahydro-2-methyl-1,5-benzothiazepine, hydrochloride*

Following the procedure of Example 1 but substituting an equivalent amount of 3-chloropropionyl chloride for the chloroacetyl chloride in part (B), 5-(3-piperidinopropionyl)-2,3,4,5-tetrahydro - 2 - methyl-1,5-benzothiazepine, hydrochloride is obtained.

EXAMPLE 9

*5-piperidinoacetyl-2,3,4,5-tetrahydro-1,5-benzothiazepine, hydrochloride*

Following the procedure of Example 1 but substituting an equivalent amount of 2,3-dihydro-1,5-benzothiazepin-4-one for the benzothiazepinone in part (A), 5-piperidinoacetyl-2,3,4,5-tetrahydro-1,5-benzothiazepine, hydrochloride is obtained.

EXAMPLE 10

*5-piperidinoacetyl-2,3,4,5-tetrahydro-2-ethyl-1,5-benzothiazepine, hydrochloride*

Following the procedure of Example 1 but substituting an equivalent amount of 2,3-dihydro-2-ethyl-1,5-benzothiazepin-4-one for the benzothiazepine in part (A), 5-piperidinoacetyl - 2,3,4,5 - tetrahydro-2-ethyl-1,5-benzothiazepine, hydrochloride is obtained.

EXAMPLE 11

*5-piperidinoacetyl-2,3,4,5-tetrahydro-3-methyl-1,5-benzothiazepine, hydrochloride*

Following the procedure of Example 1 but substituting an equivalent amount of 2,3-dihydro-3-methyl-1,5-benzothiazepin-4-one for the benzothiazepinone in part (A), 5-piperidinoacetyl-2,3,4,5 - tetrahydro - 3 - methyl-1,5-benzothiazepine, hydrochloride is obtained.

EXAMPLE 12

*5-piperidinoacetyl-2,3,4,5-tetrahydro-2,3-dimethyl-1,5-benzothiazepine, hydrochloride*

Following the procedure of Example 1 but substituting an equivalent amount of 2,3-dihydro-2,3-dimethyl-1,5-benzothiazepin-4-one for the benzothiazepinone in part (A), 5 - piperidinoacetyl-2,3,4,5-tetrahydro-2,3-dimethyl-1,5-benzothiazepine, hydrochloride is obtained.

EXAMPLE 13

*5-piperidinoacetyl-2,3,4,5-tetrahydro-2-benzyl-1,5-benzothiazepine, hydrochloride*

Following the procedure of Example 1 but substituting an equivalent amount of 2,3-dihydro-2-benzyl - 1,5-benzothiazepinone for the benzothiazepinone in part (A), 5 - piperidinoacetyl-2-benzyl - 2,3,4,5 - benzothiazepine, hydrochloride is obtained.

EXAMPLE 14

*5-piperidinoacetyl-2,3,4,5-tetrahydro-2-(p-chlorobenzyl)-1,5-benzothiazepine, hydrochloride*

Following the procedure of Example 1 but substituting an equivalent amount of 2,3-dihydro-2-(p-chlorobenzyl)-1,5-benzothiazepin-4-one for the benzothiazepinone in part (A), 4-piperidinoacetyl-2,3,4,5-tetrahydro-2-(p-chlorobenzyl)-1,5-benzothiazepine, hydrochloride.

EXAMPLE 15

*5-piperidinoacetyl-2,3,4,5-tetrahydro-2-methyl-7-chloro-1,5-benzothiazepine, hydrochloride*

Following the procedure of Example 1 but substituting an equivalent amount of 2,3-dihydro-2-methyl-7-chloro-1,5-benzothiazepin-4-one for the benzothiazepinone in part (A), 5 - piperidinoacetyl - 2,3,4,5 - tetrahydro-2-methyl-7-chloro-1,5-benzothiazepine, hydrochloride is obtained.

EXAMPLE 16

*5-piperidinoacetyl-2,3,4,5-tetrahydro-2-methyl-7-methoxy-1,5-benzothiazepine, hydrochloride*

Following the procedure of Example 1 but substituting an equivalent amount of 2,3-dihydro-2-methyl-7-methoxy-1,5-benzothiazepin-4-one for the benzothiazepinone in part (A), 5-piperidinoacetyl - 2,3,4,5-tetrahydro-2-methyl - 7 - methoxy - 1,5 - benzothiazepine, hydrochloride is obtained.

EXAMPLE 17

*5-piperidinoacetyl-2,3,4,5-tetrahydro-2,7-dimethyl-1,5-benzothiazepine, hydrochloride*

Following the procedure of Example 1 but substituting an equivalent amount of 2,3-dihydro-2,7-dimethyl-1,5-benzothiazepin-4-one for the benzothiazepinone in part (A), 5-piperidinoacetyl - 2,3,4,5-tetrahydro-2,7-dimethyl-1,5-benzothiazepine, hydrochloride is obtained.

EXAMPLE 18

*5-piperidinoacetyl-2,3,4,5-tetrahydro-2-methyl-7-(trifluoromethyl)-1,5-benzothiazepine, hydrochloride*

(A) Preparation of 2-amino-4-trifluoromethylthiophenol, hydrochloride

A suspension of 200 g. of the zinc salt of 2-amino-4-trifluoromethylthiophenol [C.A., 47, 4769 g., J. Gen. Chem., 22, 2209 (1952)] in 400 ml. of water is treated with 200 ml. of conc. hydrochloric acid and the resulting mixture stirred and heated to 80°. The starting material dissolves and the hot solution is then treated with an additional 200 ml. of conc. hydrochloric acid. The hydrochloride salt separates as a gray precipitate. After cooling overnight, the solid is filtered and the filter-cake pressed to remove mother liquor and the former material suspended in 400 ml. of ether and cooled. The light gray solid is filtered, washed with ether and dried in a desiccator over potassium hydroxide pellets; M.P. 198–199°.

(B) Preparation of 2-amino-4-trifluoromethylthiophenol

As suspension of 140.0 g. (0.61 mole) of the above hydrochloride in 200 ml. of water is treated with a solution of 25.0 g. (0.6 mole) of sodium hydroxide in 100 ml. of water. The liberated base is extracted several times and the combined extracts dried over magnesium sulfate. After filtration, the filtrate is concentrated and the residue fractionated to give a colorless liquid; B.P. 55–62° (0.2 mm.).

(C) Preparation of 2,3-dihydro-2-methyl-7-trifluoromethyl-1,5-benzothiazepin-4-one A mixture of 89.8 g. of the thiophenol from part (B) and 43.0 g. of crotonic acid is heated at 175–195° for thirty minutes. Water (6.5 ml.) is collected during this period. The product begins to crystallize from the mixture after about twenty minutes. The reaction mixture rapidly crystallizes on cooling. This material is pulverized and digested in 300 ml. of hot absolute alcohol and cooled. The colorless product is filtered and dried; M.P. 203–204°.

(D) Preparation of 5-piperidinoacetyl-2,3,4,5-tetrahydro-2 - methyl - 7 - (trifluoromethyl) - 1,5 - benzothiazepine, hydrochloride Following the procedure of Example 1 but substituting an equivalent amount of material from part (C) for the benzothiazepinone in part (A), 5-piperidinoacetyl-2,3,4,5-tetrahydro-2-methyl-7-(trifluoromethyl) - 1,5 - benzothiazepine, hydrochloride is obtained.

This invention may be variously otherwise embodied within the scope of the appended claims.

What is claimed is:
1. A compound selected from the group consisting of bases of the formula

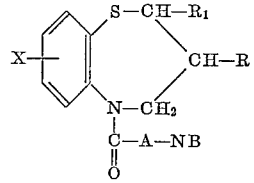

and pharmaceutically-acceptable acid-addition salts thereof, wherein X is selected from the group consisting of hydrogen, lower alkyl, lower alkoxy, nitro, halo and trifluoromethyl; R is selected from the group consisting of hydrogen and lower alkyl; $R_1$ is selected from the group consisting of hydrogen, lower alkyl and X-substituted phenyl lower alkyl; A is lower alkylene; and NB is a basic nitrogen-containing radical of less than twelve carbon atoms selected from the group consisting of amino, (lower alkyl)amino, di(lower alkyl)amino, (hydroxy-lower alkyl)amino, di(hydroxy-lower alkyl)amino, phenyl-(lower alkyl) amino, N-(lower alkyl)-N-phenyl(lower alkyl)amino, piperidino, (lower alkyl)piperidino, (lower alkoxy)piperidino, homopiperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy) morpholino, thiamorpholino, (lower alkyl)thiamorpholino, di(lower alkyl)thiamorpholino, (lower alkoxy)thiamorpholino, piperazino, (lower alkyl)piperazino, di(lower alkyl)piperazino, (lower alkoxy)piperazino, $N^4$-(hydroxy-lower alkyl)piperazino, $N^4$-(lower alkanoyloxy-lower alkyl)piperazino and homopiperazino.

2. 5 - di(lower alkyl)amino(lower alkanoyl) - 2,3,4,5-tetrahydro-2-methyl-1,5-benzothiazepine.

3. A pharmaceutically-acceptable acid-addition salt of the compound of claim 2.

4. A pharmaceutically-acceptable acid-addition salt of 5 - piperidinoacetyl - 2,3,4,5 - tetrahydro - 2 - methyl - 1,5-benzothiazepine.

5. A pharmaceutically-acceptable acid-addition salt of 5 - ($N^4$ - methylpiperazinoacetyl) - 2,3,4,5 - tetrahydro - 2-methyl-1,5-benzothiazepine.

6. A compound of the formula

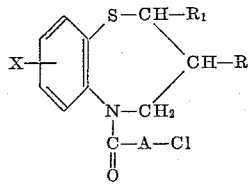

wherein X is selected from the group consisting of hydrogen, lower alkyl, lower alkoxy, nitro, halo and trifluoromethyl; R is selected from the group consisting of hydrogen and lower alkyl; $R_1$ is selected from the group consisting of hydrogen, lower alkyl and X-substituted phenyl lower alkyl and A is lower alkylene.

7. 5-(chloro-lower alkanoyl) - 2,3,4,5 - tetrahydro-2-methyl-1,5-benzothiazepine.

8. 5-chloroacetyl - 2,3,4,5 - tetrahydro - 2 - methyl-1,5-benzothiazepine.

9. A compound of the formula:

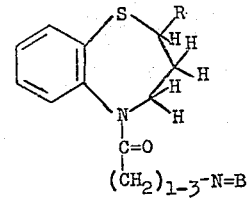

wherein R is a member selected from the group consisting of hydrogen and lower alkyl; and N=B is a member selected from the group consisting of di-(lower alkyl)-amino, di-(hydroxy lower alkyl)amino, 1-piperidyl, lower alkylated 1-piperidyl, 1-pyrrolidyl, lower alkylated 1-pyrrolidyl, 4-morpholinyl, lower alkylated 4-morpholinyl and 1-piperazinyl.

10. A compound of the formula:

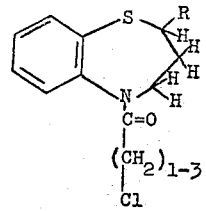

wherein R is selected from the group consisting of hydrogen and lower alkyl.

References Cited

UNITED STATES PATENTS 3,029,251  4/1962  Fancher et al. _____ 260—327

OTHER REFERENCES

Hromatka et al.: Monatsh. Fur Chemie, vol. 88 (1957), pp. 64–71.

J. A. PATTEN, *Primary Examiner.*

N. S. RIZZO, *Examiner.*